(12) United States Patent
Blanchet et al.

(10) Patent No.: US 10,468,691 B2
(45) Date of Patent: Nov. 5, 2019

(54) BIPOLAR PLATES FOR USE IN CONDUCTION-COOLED ELECTROCHEMICAL CELLS

(71) Applicant: Nuvera Fuel Cells, LLC, Billerica, MA (US)

(72) Inventors: Scott Blanchet, Chelmsford, MA (US); Benjamin Lunt, Tewksbury, MA (US); Edward Domit, Westford, MA (US); Roger Van Boeyen, Westford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 298 days.

(21) Appl. No.: 15/203,014

(22) Filed: Jul. 6, 2016

(65) Prior Publication Data

US 2016/0315333 A1    Oct. 27, 2016

Related U.S. Application Data

(63) Continuation of application No. 14/041,527, filed on Sep. 30, 2013, now Pat. No. 9,413,016.
(Continued)

(51) Int. Cl.
*H01M 8/02* (2016.01)
*H01M 8/04* (2016.01)
(Continued)

(52) U.S. Cl.
CPC .......... *H01M 8/0267* (2013.01); *C25B 9/066* (2013.01); *C25B 15/00* (2013.01); *C25B 15/02* (2013.01);
(Continued)

(58) Field of Classification Search
CPC ...... H01M 8/04; H01M 8/02; H01M 8/04267; H01M 8/04007; H01M 8/021; H01M 8/0228
See application file for complete search history.

(56) References Cited

U.S. PATENT DOCUMENTS 4,582,765 A  *  4/1986  Kothmann ........ H01M 8/04014
                                                                165/97
6,492,053 B1   12/2002  Donelson et al.
(Continued)

FOREIGN PATENT DOCUMENTS

DE   10200902294   * 11/2010 ........ H01M 8/04104
JP   2004-273140 A    9/2004
(Continued)

OTHER PUBLICATIONS

Notification of Reasons for Rejection issued in Japanese Patent Application No. 2015-535718, dated Feb. 13, 2018, with English translation (9 pages).
(Continued)

*Primary Examiner* — Kenneth J Douyette
(74) *Attorney, Agent, or Firm* — Finnegan, Henderson, Farabow, Garrett & Dunner, LLP

(57) ABSTRACT

The present disclosure is directed towards the design of bipolar plates for use in conduction-cooled electrochemical cells. Heat generated during the operation of the cell is removed from the active area of the cell to the periphery of the cell via the one or more bipolar plates in the cell. The one or more bipolar plates are configured to function as heat sinks to collect heat from the active area of the cell and to conduct the heat to the periphery of the plate where the heat is removed by traditional heat transfer means. The boundary of the one or more bipolar plates can be provided with heat dissipation structures to facilitate removal of heat from the plates. To function as effective heat sinks, the thickness of the one or more bipolar plates can be determined based on the rate of heat generation in the cell during operation, the thermal conductivity ("k") of the material selected to form the plate, and the desired temperature gradient in a direction orthogonal to the plate ("$\Delta T$").

20 Claims, 13 Drawing Sheets

Related U.S. Application Data

(60) Provisional application No. 61/817,689, filed on Apr. 30, 2013, provisional application No. 61/817,707, filed on Apr. 30, 2013, provisional application No. 61/711,502, filed on Oct. 9, 2012.

(51) Int. Cl.
| | |
|---|---|
| *H01M 8/0267* | (2016.01) |
| *H01M 8/04007* | (2016.01) |
| *C25B 9/06* | (2006.01) |
| *C25B 15/00* | (2006.01) |
| *C25B 15/02* | (2006.01) |
| *H01M 8/021* | (2016.01) |
| *H01M 8/0228* | (2016.01) |
| *H01M 8/2483* | (2016.01) |
| *H01M 8/241* | (2016.01) |
| *H01M 8/0258* | (2016.01) |
| *H01M 8/0256* | (2016.01) |
| *H01M 8/04014* | (2016.01) |
| *H01M 8/0206* | (2016.01) |
| *H01M 8/0208* | (2016.01) |
| *H01M 8/04029* | (2016.01) |

(52) U.S. Cl.
CPC ......... *H01M 8/021* (2013.01); *H01M 8/0228* (2013.01); *H01M 8/0256* (2013.01); *H01M 8/0258* (2013.01); *H01M 8/04014* (2013.01); *H01M 8/04067* (2013.01); *H01M 8/241* (2013.01); *H01M 8/2483* (2016.02); *H01M 8/0206* (2013.01); *H01M 8/0208* (2013.01); *H01M 8/04029* (2013.01)

(56) References Cited

U.S. PATENT DOCUMENTS

| | | | |
|---|---|---|---|
| 6,492,055 B1 | 12/2002 | Shimotori et al. | |
| 2002/0104645 A1 | 8/2002 | Yoshida et al. | |
| 2003/0059662 A1* | 3/2003 | Debe | H01M 8/026 429/514 |
| 2003/0118880 A1 | 6/2003 | Zimmerman et al. | |
| 2003/0203246 A1 | 10/2003 | Ronne et al. | |
| 2004/0142224 A1* | 7/2004 | Abd Elhamid | H01M 8/0206 429/435 |
| 2004/0200605 A1 | 10/2004 | Yoshida et al. | |
| 2005/0233193 A1* | 10/2005 | Holler | H01M 8/026 429/434 |
| 2006/0105213 A1 | 5/2006 | Otsuka | |
| 2006/0210865 A1 | 9/2006 | Inoue | |
| 2007/0042251 A1* | 2/2007 | Friedman | H01M 8/0228 429/508 |
| 2008/0145716 A1 | 6/2008 | Yu et al. | |
| 2009/0297903 A1* | 12/2009 | Hirayama | H01M 8/0258 429/515 |
| 2010/0273084 A1 | 10/2010 | Shimomura | |
| 2011/0159396 A1* | 6/2011 | Kleemann | H01M 8/026 429/457 |
| 2011/0189525 A1 | 8/2011 | Palanchon et al. | |
| 2012/0122003 A1 | 5/2012 | Nam et al. | |
| 2012/0141900 A1* | 6/2012 | Hahn | H01M 8/04014 429/455 |

FOREIGN PATENT DOCUMENTS

| | | |
|---|---|---|
| JP | 2006-228753 A | 8/2006 |
| JP | 2009-54414 A | 3/2009 |
| JP | 2009252491 A | 10/2009 |
| WO | WO 00/31814 A1 | 6/2000 |

OTHER PUBLICATIONS

International Preliminary Report on Patentability for PCT/US2013/062653, dated Apr. 14, 2015.
Intention to Grant from EPO for EP13773583.3, dated Sep. 30, 2016.
Second Intention to Grant from EPO for EP13773583.3, dated Dec. 12, 2016.
Notification of Reasons for Rejection from Japanese Patent Office for JP 2015-535718 dated Jul. 27, 2017.
Invitation to Pay Additional Fees and Communication Relating to the Results of the Partial International Search dated Dec. 19, 2013 in International Application No. PCT/US2013/062653.

\* cited by examiner

BIPOLAR PLATES FOR USE IN CONDUCTION-COOLED ELECTROCHEMICAL CELLS

This application is a continuation of U.S. patent application Ser. No. 14/041,527, filed Sep. 30, 2013, which claims priority to U.S. Provisional Application No. 61/817,689, filed Apr. 30, 2013, U.S. Provisional Application No. 61/817,707, filed Apr. 30, 2013, and U.S. Provisional Application No. 61/711,502, filed Oct. 9, 2012, each of which are incorporated herein by reference.

TECHNICAL FIELD

The present disclosure is directed towards electrochemical cells, and more specifically, the design of bipolar plates for use in conduction-cooled electrochemical cells.

BACKGROUND

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons flow through the circuit to the cathode and generates electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" depends largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack. The fuel cells are stacked together sequentially, each cell including a cathode, a electrolyte membrane, and an anode. Each cathode/membrane/anode assembly constitutes a "membrane electrode assembly", or "MEA", which is typically supported on both sides by bipolar plates. Gases (hydrogen and air) are supplied to the electrodes of the MEA through channels or grooves formed in the plates, which are known as flow fields. In addition to providing mechanical support, the bipolar plates (also known as flow field plates or separator plates) physically separate individual cells in a stack while electrically connecting them. The bipolar plates also act as current collectors, provide access channels for the fuel and the oxidant to the respective electrode surfaces, and provide channels for the removal of water formed during operation of the cell. Typically, bipolar plates are made from metals, for example, stainless steel, titanium, etc., and from non-metallic electrical conductors, for example, graphite.

Additionally, a typical fuel cell stack includes manifolds and inlet ports for directing the fuel and oxidant to the anode and cathode flow fields, respectively. The stack may also include a manifold and inlet port for directing a coolant fluid to interior channels within the stack to absorb heat generated during operation of the individual cells. A fuel cell stack also includes exhaust manifolds and outlet ports for expelling the unreacted gases and the coolant water.

FIG. 1 is an exploded schematic view showing the various components of a prior art PEM fuel cell 10. As illustrated, bipolar plates 2 flank the "membrane electrode assembly" (MEA), which comprises an anode 7A, a cathode 7C, and an electrolyte membrane 8. Hydrogen atoms supplied to anode 7A are electrochemically split into electrons and protons (hydrogen ions). The electrons flow through an electric circuit to cathode 7C and generate electricity in the process, while the protons move through electrolyte membrane 8 to cathode 7C. At the cathode, protons combine with electrons and oxygen (supplied to the cathode) to produce water and heat.

Additionally, prior art PEM fuel cell 10 comprises electrically-conductive gas diffusion layers (GDLs) 5 within the cell on each side of the MEA. GDLs 5 serve as diffusion media enabling the transport of gases and liquids within the cell, provide electrical conduction between bipolar plates 2 and electrolyte membrane 8, aid in the removal of heat and process water from the cell, and in some cases, provide mechanical support to electrolyte membrane 8. GDLs 5 can comprise a woven or non-woven carbon cloth with electrodes 7A and 7C located on the sides facing the electrolyte membrane. In some cases, the electrodes 7A and 7C include an electrocatalyst material coated onto either the adjacent GDL 5 or the electrolyte membrane 8. Some high pressure or high differential pressure fuel cells use "frit"-type densely sintered metals, screen packs, expanded metals, metal foam, or three-dimensional porous metallic substrates in combination with or as a replacement for traditional GDLs to provide structural support to the MEA in combination with traditional, land-channel flow fields 4 formed in the bipolar plates 2. In some high pressure or high differential pressure cells, metal foams or three-dimensional porous metallic substrates can be used as a replacement for traditional channel-type flow fields 4 as well.

In a typical fuel cell, reactant gases on each side of the electrolyte membrane flow through the three-dimensional porous metallic flow fields or the traditional channel-type flow fields and then diffuse through the porous GDL to reach the electrolyte membrane. Since the flow field and the GDL are positioned contiguously and are coupled by the internal fluid streams, the flow field and the GDL are collectively referred to as "flow structure" hereinafter, unless specified otherwise. It is within the scope of the present disclosure to use traditional channel-type flow fields in combination with three-dimensional porous metallic GDLs, to use three-dimensional porous metallic flow fields in combination with traditional GDLs, or to use three-dimensional porous metallic substrates as both flow fields and GDLs.

Although the use of porous metallic flow structures overcome some of the physical limitations and performance penalties of high pressure or high differential pressure electrochemical cell operation, such electrochemical cells/cell stacks generally face the additional challenges of sealing the high pressure fluid within the cells and maintaining a good power-to-weight ratio. Typically, electrochemical cells, including high pressure or high differential pressure electrochemical cells, rely on separate cooling cells or cooling plates (collectively referred to as the "cooling device" hereinafter) interposed between adjacent cells in a stack. The cooling devices are generally constructed with internal fluid channels which run parallel to the horizontal plane of the stacked cells. Coolant fluid is pumped through the channels to remove heat generated during the operation of the cell stack. Heat transfer using one or more cooling devices is essential for an electrochemical cell stack with high rate of heat generation (e.g., >200 mW/cm$^2$). However, for a cell stack operating at low heat generation rates, for example, hydrogen compressors, the separate cooling devices needlessly complicate the architecture of the cell stack, increase the cost and weight of the stack, and reduce the efficiency (i.e., decrease the electrical output) of the stack due to the added contact resistances between the cooling devices and the bipolar plates. Thus, the challenges faced by high pressure or high differential pressure electrochemical cell stacks are aggravated by convective cooling of the stacks using cooling devices between adjacent cells.

The present disclosure is directed towards the design of improved cooling systems for use in electrochemical cell stacks. In particular, the present disclosure is directed towards the design of bipolar plates for use as heat sinks (or cold plates) in conductive cooling of electrochemical cells, including, but not limited to, fuel cells, electrolysis cells, hydrogen purifiers, hydrogen expanders, and hydrogen compressors. The required cooling can be accomplished by using the one or more bipolar plates of each electrochemical cell to collect heat from the active area of the cell and to conduct the heat to at least a portion of the external boundary of the cell where the heat can be removed by traditional heat transfer means. Such an arrangement can obviate the need for using coolant fluid channels within the central, active area of the cell stack.

SUMMARY

A first aspect of the present disclosure is an electrochemical cell having an active area comprising a first electrode, a second electrode, an electrolyte membrane disposed between the first and the second electrodes, and a first flow structure adjacent the first electrode. The cell further comprises at least one bipolar plate adjacent the first flow structure, the at least one bipolar plate comprising a plurality of coolant fluid surfaces located outside the boundary of the active area. The at least one bipolar plate is configured to function as a heat sink to collect heat generated in the active area during operation of the cell and to conduct the heat to the plurality of coolant fluid surfaces. Further, at least one of the plurality of coolant fluid surfaces in the cell is provided with a heat dissipation structure to facilitate removal of heat from the at least one bipolar plate.

In another embodiment, the heat dissipation structure can comprise fins extending from the least one bipolar plate. In another embodiment, the heat dissipation structure can comprise a first plurality of aligned perforations. In another embodiment, a first set of coolant fluid channels can be routed through the first plurality of aligned perforations. In another embodiment, the heat dissipation structure can comprise an edge manifold thermally coupled to an edge of the at least one bipolar plate, and further wherein a set of coolant fluid channels is routed through the edge manifold.

In another embodiment, the heat dissipation structure can further comprise fins extending from the edge of the at least one bipolar plate. In another embodiment, the fins can be contiguous to the coolant fluid channels routed through the edge manifolds. In another embodiment, the thickness of the at least one bipolar plate can be based on the thermal conductivity of the material used to form the bipolar plate, a predetermined temperature gradient along a direction orthogonal to a surface of the bipolar plate interfacing the first flow structure, and a predetermined amount of heat flux along the length of the bipolar plate.

In another embodiment, the thickness of the at least one bipolar plate can range from about 0.03 mm to about 3 mm. In another embodiment, the at least one bipolar plate can be fabricated from a material that has a thermal and electrical conductivity higher than that of 316 stainless steel. In another embodiment, the at least one bipolar plate can be fabricated from a material chosen from aluminum, steel, stainless steel, titanium, copper, Ni—Cr alloy, and Inconel. In another embodiment, the at least one bipolar plate can be fabricated from a clad material. In another embodiment, the clad material can comprise aluminum clad with stainless steel.

In another embodiment, the electrochemical cell can comprise a non-circular external pressure boundary. In another embodiment, the electrochemical cell can comprise a generally rectangular external pressure boundary. In another embodiment, the electrochemical cell can comprise a circular external pressure boundary. In another embodiment, the electrochemical cell can further comprise a second bipolar plate. In another embodiment, the electrochemical cell can further comprise a second flow structure between the second electrode and the second bipolar plate.

In another embodiment, at least one of the first and the second flow structures can comprise a porous substrate. In another embodiment, at least one of the first and the second flow structures can comprise a compacted porous metallic substrate. In another embodiment, at least one of the first and the second flow structures can comprise a micro-porous material layer laminated onto the compacted porous metallic substrate.

A second aspect of the present disclosure is an electrochemical cell stack comprising two or more cells. At least one cell in the stack has an active area comprising a first electrode, a second electrode, an electrolyte membrane disposed between the first and the second electrodes, and a first flow structure adjacent the first electrode. The at least one cell further comprises at least one bipolar plate adjacent the first flow structure, the at least one bipolar plate comprising a plurality of coolant fluid surfaces located outside the boundary of the active area. The at least one bipolar plate is configured to function as a heat sink to collect heat generated in the active area during operation of the cell and to conduct the heat to the plurality of coolant fluid surfaces. Further, at least one of the plurality of coolant fluid surfaces in the cell is provided with a heat dissipation structure to facilitate removal of heat from the at least one bipolar plate. In another embodiment, the heat dissipation structure can comprise fins extending from the least one bipolar plate.

In another embodiment, the heat dissipation structure can comprise a first plurality of aligned perforations. In another embodiment, a first set of coolant fluid channels can be routed through the first plurality of aligned perforations. In another embodiment, coolant fluid can flown in parallel through two or more sets of coolant fluid channels, each set of coolant fluid channels being located at separate coolant fluid surfaces of the at least one bipolar plate. In another embodiment, coolant fluid can flown in series through two or more sets of coolant fluid channels, each set of coolant fluid channels being located at separate coolant fluid surfaces of the at least one bipolar plate.

In another embodiment, the heat dissipation structure can comprise a second plurality of aligned perforations through which a second set of coolant fluid channels are routed, and wherein the first plurality of aligned perforations is positioned closer to an external edge of the at least one coolant fluid surface and the second plurality of aligned perforations is positioned closer to the boundary of the active area. In another embodiment, coolant fluid can flow in series first through the second set of coolant fluid channels and then the first set of coolant fluid channels. In another embodiment, the heat dissipation structure can comprise an edge manifold thermally coupled to an edge of the at least one bipolar plate, and further wherein a set of coolant fluid channels is routed through the edge manifold. In another embodiment, the two or more electrochemical cells can be positioned consecutively in the cell stack. In another embodiment, the cell stack is free from any fluid channels in between the two or more electrochemical cells.

BRIEF DESCRIPTION OF THE DRAWINGS

The accompanying drawings, which are incorporated in and constitute a part of this specification, illustrate embodiments of the invention and together with the description, serve to explain the principles of the various aspects of the invention.

DESCRIPTION OF THE EMBODIMENTS

It is to be understood that both the foregoing general description and the following detailed description are exemplary and explanatory only and are not restrictive of the invention, as claimed.

Reference will now be made to certain embodiments consistent with the present disclosure, examples of which are illustrated in the accompanying drawings. Wherever possible, the same reference numbers are used throughout the drawings to refer to the same or like parts. It is to be understood that although the present disclosure is described in relation to a high differential pressure electrochemical cell, the devices and methods of the present disclosure can be employed with various types of electrochemical cells, including, but not limited to, high pressure and low pressure cells, cells with a low rate of heat generation, as well as cells operating at a high rate of heat generation.

The present disclosure is directed towards the design of bipolar plates for use in conduction-cooled electrochemical cells. In such electrochemical cells, the necessary cooling is provided by conduction of generated heat from the active area of the cell (described later in this disclosure) to the cell's periphery via the one or more bipolar plates of the cell. The heat is removed from the periphery of the cell by traditional heat transfer means. In some exemplary embodiments, the heat is removed from the periphery of the cell by coolant fluids. In other embodiments, the heat is removed from the periphery of the cell using air flow. In additional embodiments, the heat is removed from the periphery of the cell using a combination of coolant fluid and air flow.

In some embodiments, the electrochemical cells have a cylindrical shape, i.e., the cells have circular pressure boundaries, which allow the cells to rely on the hoop stresses generated circumferentially to balance the fluid pressure within the cells. In some other embodiments, the electrochemical cells have non-circular external pressure boundaries, i.e., the cells have non-circular profiles. In some exemplary embodiments, the cells have a generally rectangular profile. In one such embodiment, the cell has a true rectangular profile. In another such embodiment, the cell has a square profile. In yet another such embodiment, the cell has a "race-track" profile, i.e., a substantially rectangular shape with semi-elliptical lateral sides. Some exemplary electrochemical cells can have generally rectangular profiles (for example, rectangular, square shapes, etc.) with rounded corners. The base geometry of a bipolar plate corresponds to the shape of the cell's external pressure boundary. For example, an electrochemical cell having a non-circular profile comprises one or more bipolar plates having non-circular base geometries. That is, if an illustrative electrochemical cell has a generally rectangular profile, then the one or more bipolar plates of the cell have generally rectangular base geometries.

Figure 1:
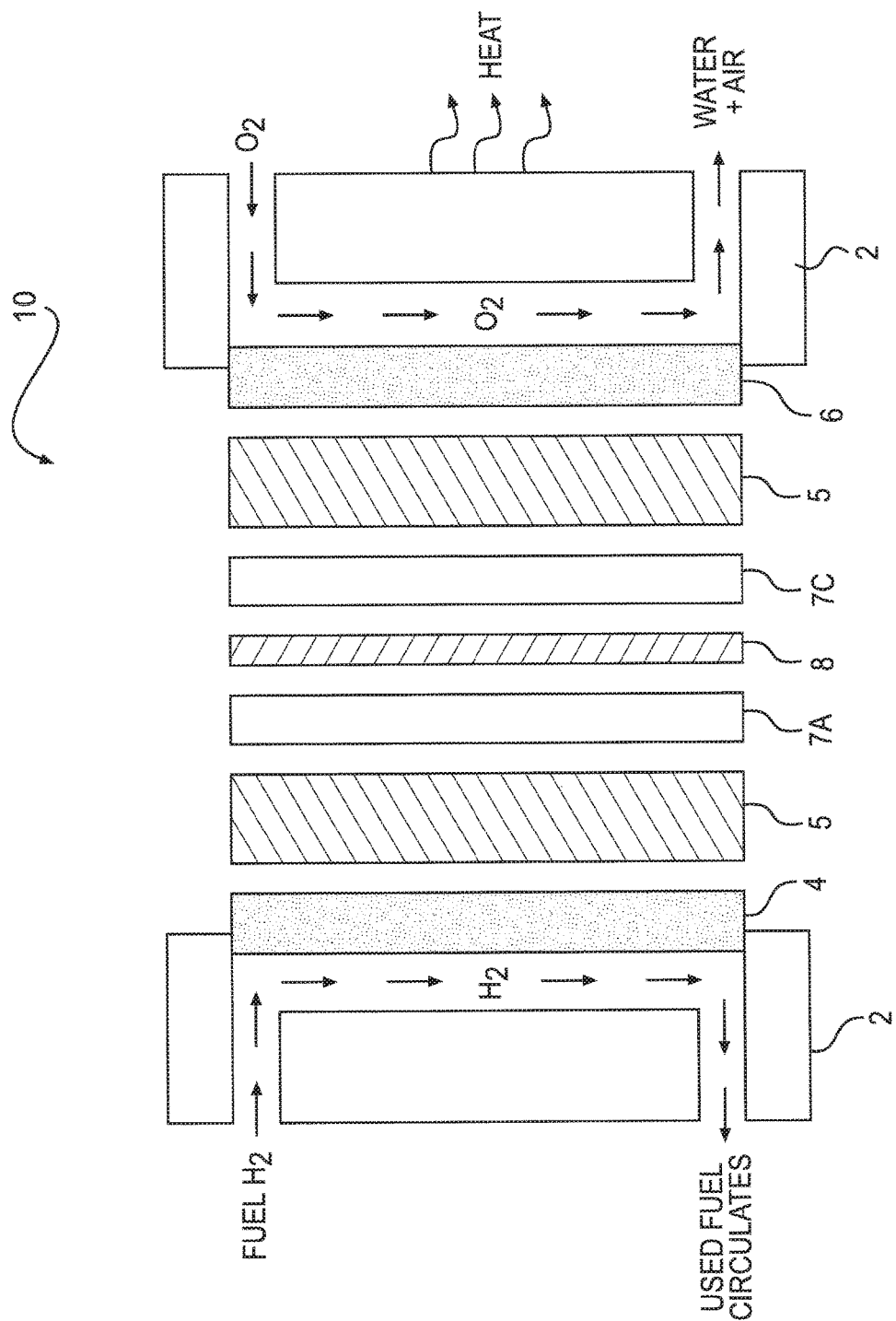
FIG. 1 illustrates an exploded schematic view showing the various components of a prior art Proton Exchange Membrane (PEM) fuel cell.
Figure 2:
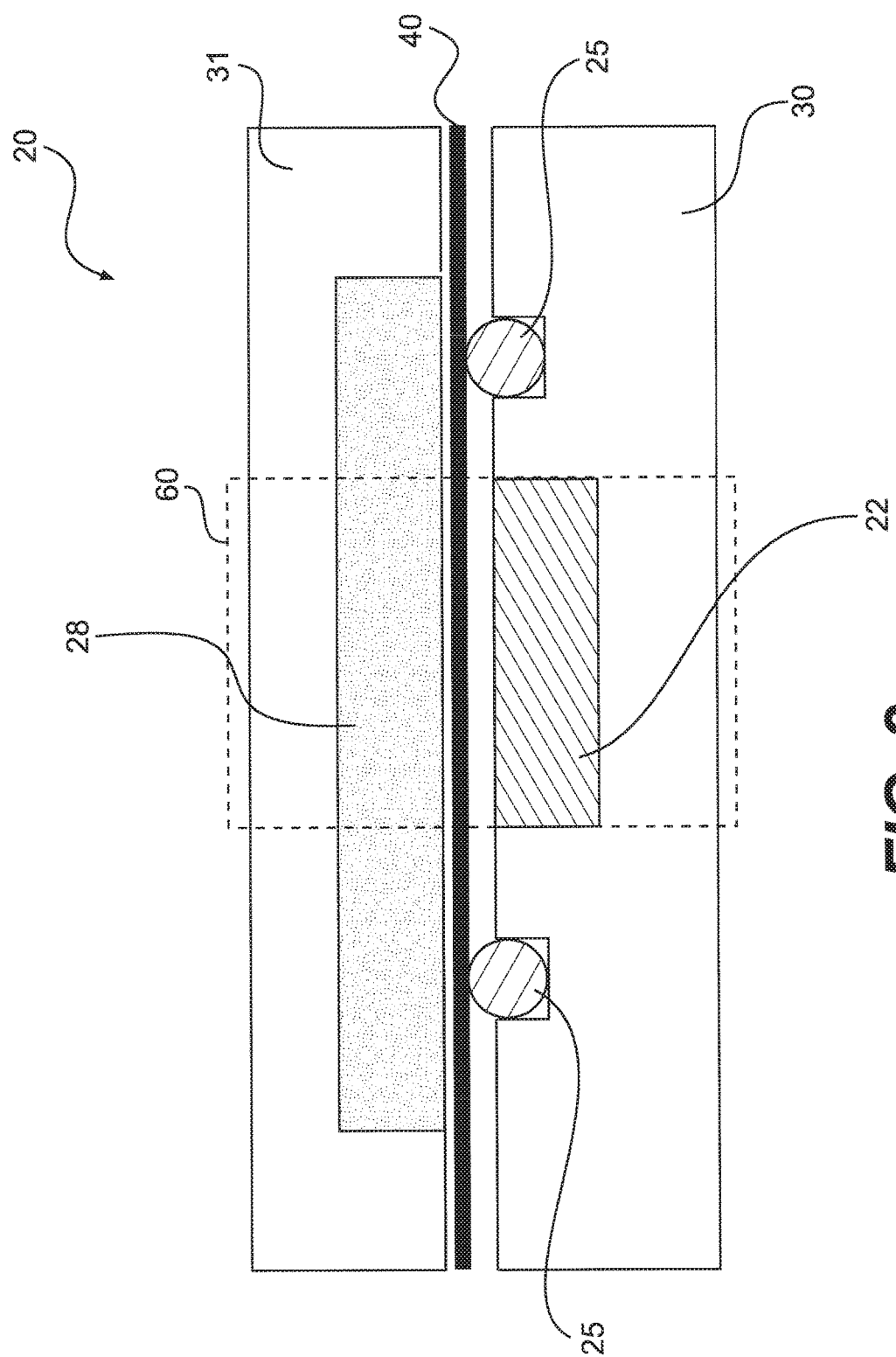
FIG. 2 illustrates a cross-sectional view of an electrochemical cell for use in high differential pressure operations, in accordance with exemplary embodiments of the present disclosure.

In some embodiments, each electrochemical cell in a cell stack comprises two bipolar plates, one on each side of the membrane-electrode-assembly (MEA). FIG. 2 shows a cross-sectional view of a high differential pressure electrochemical cell 20 having a rectangular geometry and two bipolar plates 30, 31. Bipolar plate 30 is situated on the high pressure-side and bipolar plate 31 is situated on the low pressure-side of cell 20. As illustrated in FIG. 2, cell 20 comprises a MEA 40 which is flanked by flow structures 22 and 28 on either side. Flow structures 22 and 28 are surrounded by bipolar plates 30 and 31, respectively, which separate electrochemical cell 20 from the neighboring cells in the stack. Area 60 represents the active area of the cell, which is exposed to the fuel and the oxidant. Area 60 encompasses the flow structures 22, 28 and at least the portion of the MEA that borders the flow structures 22, 28.

In additional embodiments, two adjacent electrochemical cells in a cell stack share a bipolar plate, i.e., if the stack comprises n cells, then the total number of bipolar plates in the stack is (n+1). In such embodiments, a single bipolar plate can have flow field features on both sides of the plate—for instance, one side of the plate supports the flow structure of one cell and the other side supports the flow structure of an adjoining cell.

Referring again to FIG. 2, when a cell is used for high differential pressure operations, one of the flow structures in the electrochemical cell is exposed to higher fluid pressure during operation than the flow structure on the other side of the electrolyte membrane. Hereinafter, the flow structure that is exposed to higher fluid pressure during operation is referred to as the "high pressure flow structure" and the flow structure that is subjected to comparatively lower fluid pressures is referred to as the "low pressure flow structure." In FIG. 2, for instance, flow structure 22 is designated as the high pressure flow structure and flow structure 28 is designated as the low pressure flow structure.

In an exemplary embodiment, as depicted in FIG. 2, high pressure flow structure 22 has a smaller surface area than low pressure flow structure 28 at the flow structure—MEA interface, i.e., on the sides facing the electrolyte membrane. The boundary of high pressure field 22 at the flow structure—MEA interface is completely encompassed by the boundary of low pressure flow structure 28. In such an arrangement, the high fluid pressures acting on the electrolyte membrane from the high pressure flow structure 22 is continuously balanced by the structural support provided by the low pressure flow structure 28 located on the other side of the membrane. The uniform and continuous support provided by the low pressure flow structure 28 protects against high stress points on the membrane which are known to cause membrane failure. The reinforcement provided by low pressure flow structure 28 further ensures that the membrane does not flex excessively under the high pressure, thereby preventing membrane rupture.

FIG. 2 further demonstrates that a seal 25, provided between the bipolar plate 30 on the high pressure side and the electrolyte membrane, is contained entirely within the perimeter of the low pressure field on the side facing the membrane, such that the high pressure-side sealing is accomplished against the contiguous low pressure flow structure. Seal 25, also referred to herein as the high pressure-side seal, pinches the membrane against low pressure flow structure 28 to prevent leakage of high pressure gas. Such an arrangement ensures that any discontinuities in the low pressure side (e.g., any portion of the membrane that is not supported by the low pressure flow structure, or any gap between the bipolar plate and the low pressure flow structure) are not exposed to high pressures. In exemplary embodiments, all of the high pressure-side seals in the entire cell stack are within the perimeters of the respective low pressure flow structures.

Figure 3A:
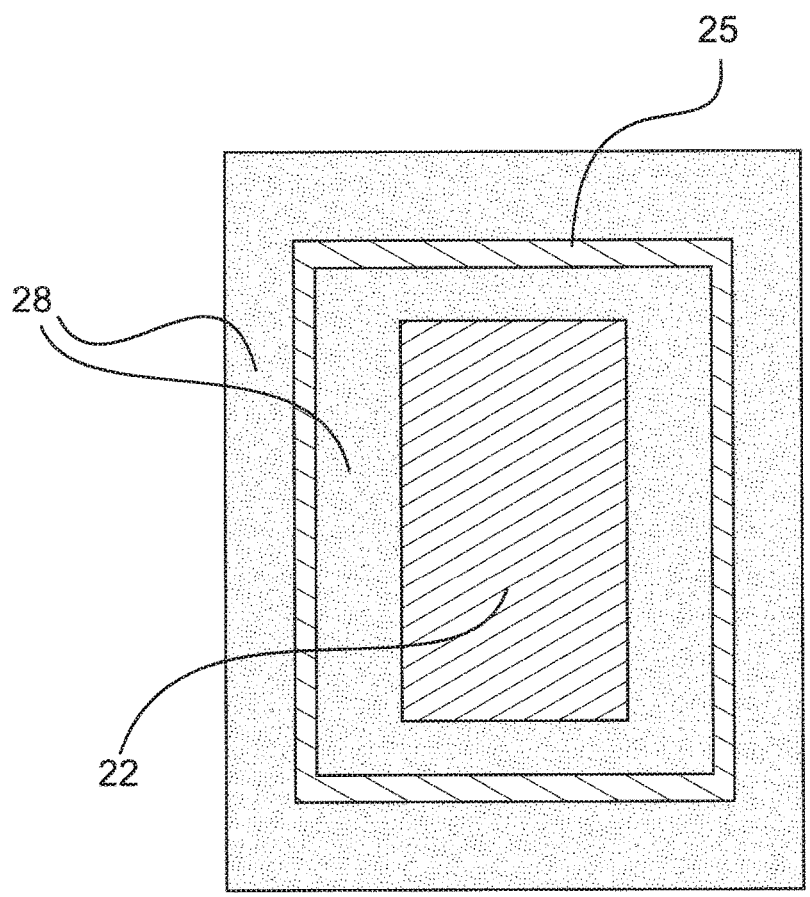
FIGS. 3A and 3B illustrate plan views of the high pressure and low pressure flow structures in electrochemical cells, in accordance with exemplary embodiments of the present disclosure.

In some embodiments, if a bipolar plate has a non-circular base geometry, then the adjoining flow structure also has a non-circular geometry. FIG. 3A shows a plan view of the flow structures of an illustrative high differential pressure electrochemical cell having a rectangular geometry. In such an embodiment, flow structures 22 and 28 have rectangular profiles. As illustrated in FIG. 3, the perimeter of the high pressure flow structure 22 is contained entirely within the perimeter of the low pressure flow structure on the side facing the electrolyte membrane. Seal 25 is also contained within the perimeter of the low pressure flow structure on the side facing the membrane, such that the high pressure-side sealing is accomplished against the contiguous low pressure flow structure.

Figure 3B:
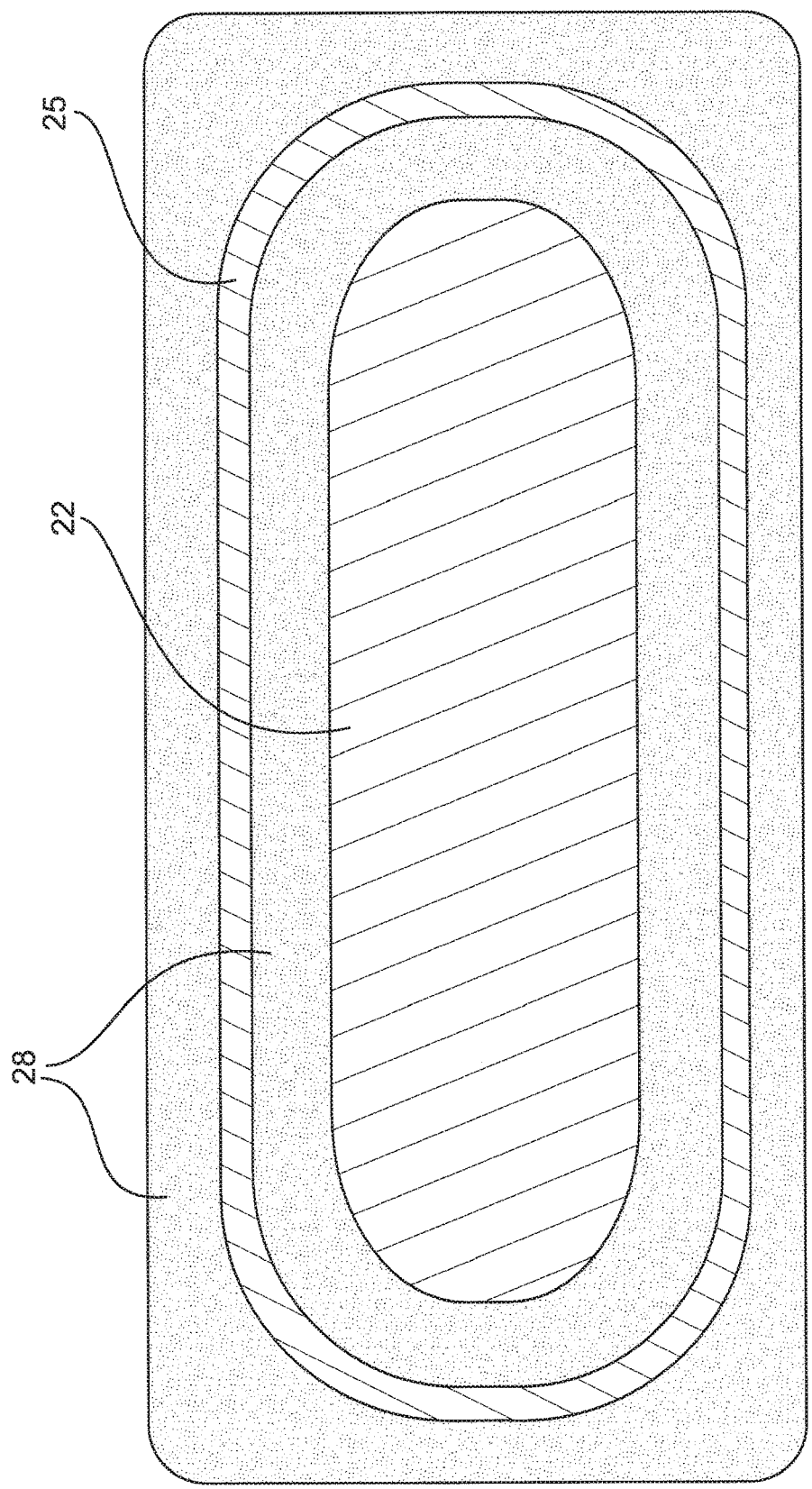

In other embodiments, the base geometry of the one or more bipolar plates in a cell do not correspond to the geometries of the flow structures in the cell. For example, a bipolar plate having a rectangular base geometry can support an adjoining flow structure having a circular geometry. Similarly, the high pressure and low pressure flow structures in a high differential pressure cell can have different geometries. FIG. 3B shows a plan view of the flow structures of an illustrative high differential pressure electrochemical cell where the high pressure flow structure 22 and low pressure flow structure 28 have different geometries. As illustrated in FIG. 3B, the low pressure flow structure 28 has a rectangular profile with rounded corners, while the high pressure flow structure 22 and the high pressure-side seal 25 have a "race-track" profile. The perimeter of the high pressure flow structure 22, as well as seal 25, are contained entirely within the perimeter of the low pressure flow structure 28, as shown in FIG. 3B.

In an illustrative embodiment, flow structures 22, 28 are fabricated using metal foams or other porous metallic substrates. In one such embodiment, an open, cellular flow structure is formed by compacting a highly porous metallic material, such as, for example, a metal foam, sintered metal frit, or any other porous metal. The porous metallic material can comprise a metal, such as, for example, stainless steel, titanium, aluminum, nickel, iron, etc., or a metal alloy, such as, nickel chrome alloy, nickel-tin alloy, etc. In certain embodiments, low pressure flow structure 28 is compacted to a density level greater than that of high pressure flow structure 22. Further, in some embodiments, the compacted porous metallic matrix is laminated on one side with a micro-porous material layer (MPL) to form the flow structure. In additional embodiments, the MPL is coated with an electrocatalyst layer if the electrocatalyst is not integral to the membrane electrode assembly. The resulting laminated structure can be arranged in the electrochemical cell with the electrocatalyst layer positioned adjacent to the membrane. In some embodiments where MPL is not used, the electrocatalyst layer can be coated directly onto the compacted porous metallic substrate on the side facing the electrolyte membrane.

In exemplary embodiments of conduction-cooled electrochemical cell stacks, the one or more bipolar plates in each cell are configured to function as heat sinks. The heat generated during the operation of the cell stack is collected by the bipolar plates and the heat is conducted away from the active area of the cells to the periphery of the plates where the heat is removed using known heat transfer means. In order for a bipolar plate to function as an effective heat sink, the bipolar plate must be configured to have sufficient thickness. In exemplary embodiments, the thickness of a bipolar plate is determined based on the rate of heat generation in the cell during operation, the thermal conductivity ("k") of the material selected to form the plate, and the desired temperature gradient in a direction orthogonal to the plate ("$\Delta T$"). For a bipolar plate to effectively conduct heat away from the active area of the cell to the periphery of the cell, the heat flux ("q") along the length ("l") of a bipolar plate must be equivalent to the rate of heat generation in the active area, which is determined based on the operative parameters of the cell. Heat flux q is thus a function of the heat conductance along the length of the plate ("k/l"), the thickness of the plate ("t") and the desired temperature gradient $\Delta T$, as shown in equation (1) below.

$$q \propto \frac{k \cdot t \cdot \Delta T}{l} \quad (1)$$

Based on equation (1), the thickness t of the bipolar plate can be adjusted to maintain the desired temperature gradient across the cell, as shown in equation (2) below.

$$t \propto \frac{q \cdot l}{k \cdot \Delta T} \quad (2)$$

Figure 4:
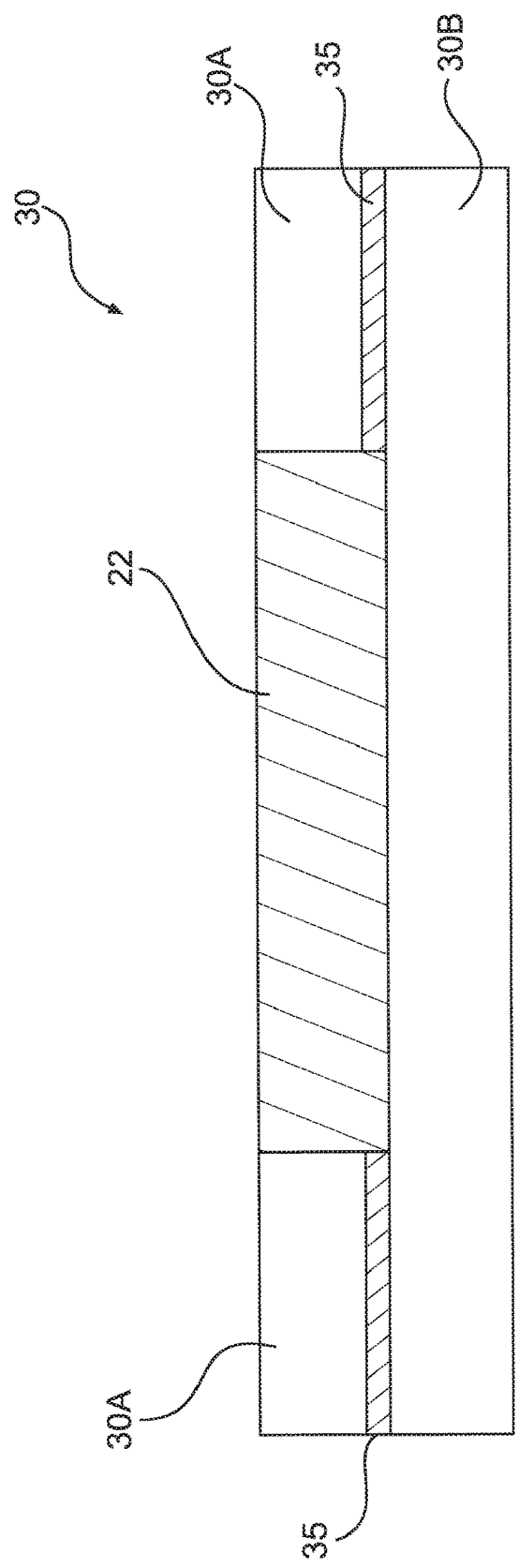
FIG. 4 illustrates a "two-piece" bipolar plate design, in accordance with exemplary embodiments of the present disclosure.

In illustrative embodiments, the thickness of the one or more bipolar plates in the cell can range from about 0.03 mm to about 3 mm. For example, the thickness of a bipolar plate can range from about 0.03 mm to about 2 mm, from about 0.03 mm to about 1 mm, from about 0.05 mm to about 2 mm, from about 0.05 mm to about 2 mm, from about 0.1 mm to about 2 mm, from about 0.1 mm to about 1 mm, from about 0.5 mm to about 2 mm, from about 0.5 mm to about 1 mm, from about 0.2 mm to about 1 mm, from about 0.2 mm to about 0.8 mm, from about 0.4 mm to about 0.6 mm, etc. In one exemplary embodiment of an electrochemical cell, the one or more bipolar plates are fabricated from a single piece of material with a pocket formed in it to contain/support the flow structure, as shown in FIG. 2. In another embodiment, the one or more bipolar plates have a "two-piece" design, as illustrated in FIG. 4. In such an embodiment, bipolar plate 30 comprises two separate pieces—framing piece 30A which forms a pocket for the flow structure, and one generally flat plate 30B. The two pieces are bonded at their interface 35 with a bonding method. The bonding method can include, but is not limited to, adhesive bonding, welding, brazing, thermal bonding with a polymer, etc.

Figure 5:
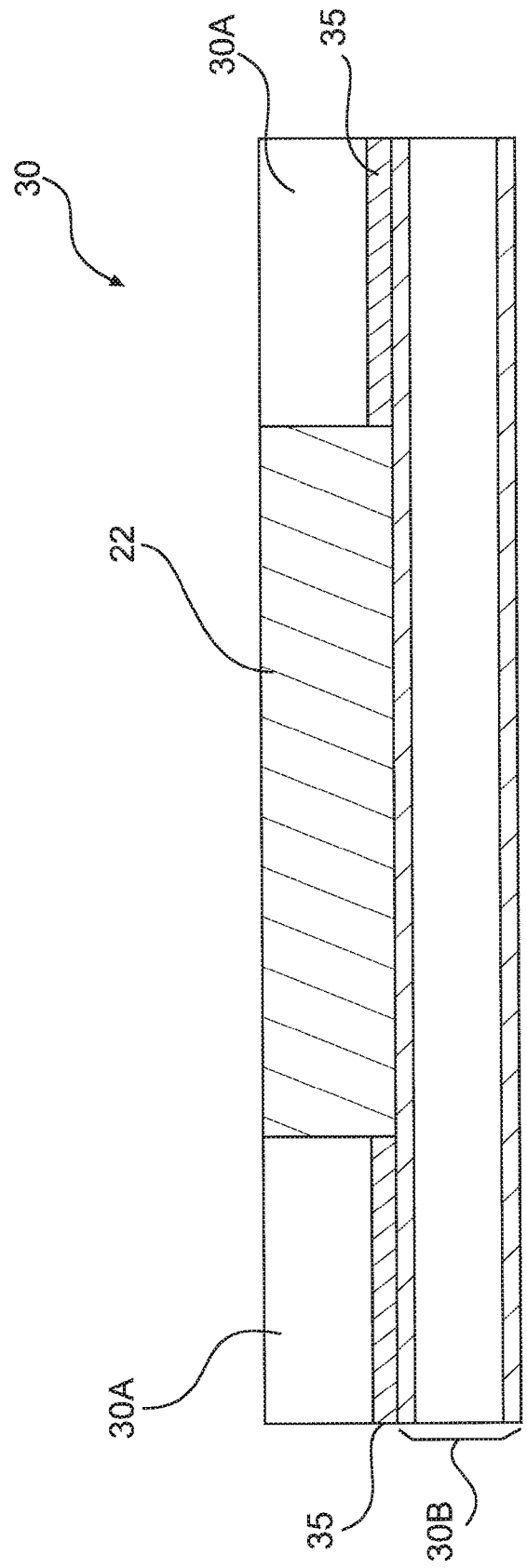
FIG. 5 illustrates a "two-piece" bipolar plate design wherein one of the pieces comprises a clad material, in accordance with exemplary embodiments of the present disclosure.

In exemplary embodiments, the bipolar plates can be made from aluminum, steel, stainless steel, titanium, copper, Ni—Cr alloy, Inconel, or any other electrically and thermally conductive material. In select embodiments, the bipolar plate comprises a material that has a thermal and electrical conductivity higher than that of 316 stainless steel. In one embodiment, the bipolar plate comprises a clad material, for example, aluminum clad with stainless steel on one or both sides. FIG. 5 illustrates a "two-piece" bipolar plate 30 wherein flat plate 30B comprises a clad material. Cladding provides the unique advantages of both metals—for example, in the case of a bipolar plate fabricated from stainless steel-clad aluminum, the stainless steel protects the aluminum core from corrosion during cell operation, while providing the superior material properties of aluminum, such as, high strength-to-weight ratio, high thermal and electrical conductivity, etc.

Referring again to the use of bipolar plates for thermal management, the heat conducted to the periphery of the bipolar plates is removed by radiation, conduction, or convection, for example, by using any appropriate air or liquid based heat transfer means, or by using heat pipes, cold plates, etc. In exemplary embodiments, at least a portion of the periphery of a bipolar plate is provided with one or more coolant fluid surfaces, which facilitate heat removal from the bipolar plate to the atmosphere or to a secondary heat transfer component, for example, one or more channels carrying a coolant fluid. In some exemplary embodiments, the one or more coolant fluid surfaces are provided to the bipolar plate of at least one cell in an electrochemical cell stack. In other exemplary embodiments, the one or more coolant fluid surfaces are provided to the one or more bipolar plates of each cell in an electrochemical cell stack. The coolant fluid surfaces are present outside the boundary of the active area of the cell. In certain embodiments, the coolant fluid surfaces are provided with heat dissipation structures to facilitate removal of heat from the bipolar plate.

Figure 6:
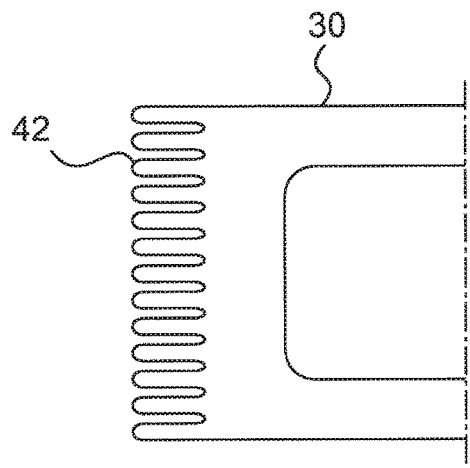
FIG. 6 illustrates a bipolar plate design wherein at least one edge of the plate comprises fins, in accordance with exemplary embodiments of the present disclosure.

In select embodiments, heat is removed from the coolant fluid surfaces by air cooling, either in the form of forced convection enabled by one or more fans, or through natural air flow. In one such embodiment, one or more edges of the bipolar plate, i.e., the coolant fluid surfaces, are provided with heat dissipation structures in the form of fins 42 (as shown in FIG. 6), which facilitate heat dissipation from the edges of the plate.

Figure 7A:
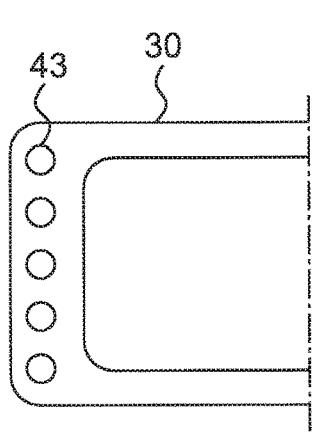
FIG. 7A illustrates a bipolar plate design wherein at least one edge of the plate comprises an internal manifold having a plurality of aligned perforations, in accordance with exemplary embodiments of the present disclosure.
Figure 7B:
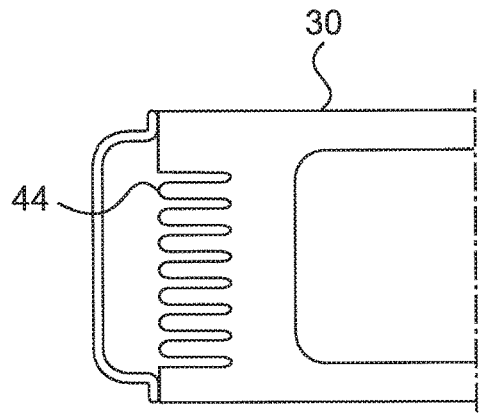
FIG. 7B illustrates a bipolar plate design wherein at least one edge of the plate comprises an external manifold and a plurality of fins, in accordance with exemplary embodiments of the present disclosure.

In some other embodiments, the heat is removed from the periphery of the bipolar plate using a coolant fluid. In such embodiments, a plurality of coolant fluid channels are passed through the coolant fluid surfaces of the bipolar plate. The coolant fluid channels run perpendicular to the surface of the bipolar plate and extend through the length of the cell stack. In select embodiments, all of the coolant fluid channels in the stack are provided at the periphery of the cells, i.e., at the coolant fluid surface, such that the active area of the cell stack is free from any coolant fluid channel. Such an approach isolates coolant fluid from the active area of the stack. In one such embodiment, the coolant fluid channels are internally manifolded through one or more coolant fluid surfaces of the bipolar plate. In such an embodiment, the one or more coolant fluid surfaces comprise heat dissipation structures in the form of a plurality of aligned holes/perforations 43, as shown in FIG. 7A. The coolant fluid channels are routed through the holes/perforations 43. In another embodiment, the coolant fluid surfaces comprise heat dissipation structures in the form of one or more edge manifolds thermally coupled to one or more edges of the bipolar plate. In such configurations, the coolant fluid channels are passed through the one or more edge manifolds. FIG. 7B depicts select embodiments where the coolant fluid surfaces comprise a plurality of fins 44 at the ends of the bipolar plate adjacent the edge manifolds. In such embodiments, fins 44 facilitate heat dissipation from the plate to the coolant fluid flowing in the channels routed through the edge manifolds.

Figure 8:
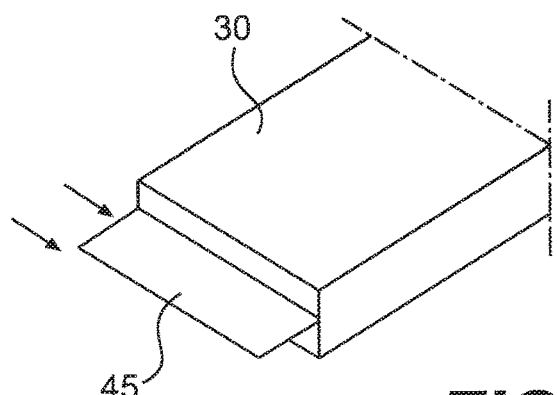
FIG. 8 illustrates a bipolar plate design wherein at least one edge of the plate comprises a fin extending parallel to the plate, in accordance with exemplary embodiments of the present disclosure.

In additional embodiments, the one or more coolant fluid surfaces comprise heat dissipation structures in the form of flat fins 45 extending outward from one or more edges of the plate, as illustrated in FIG. 8. In such embodiments, coolant fluid is passed parallel to the bipolar plate in between two adjacent fins in the stack, as indicated by the direction of the arrows in FIG. 8.

Figure 9:
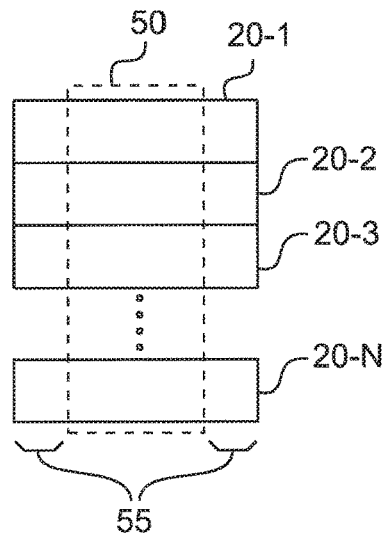
FIG. 9 illustrates a schematic front view of a conduction cooled electrochemical cell stack comprising a plurality of electrochemical cells, in accordance with exemplary embodiments of the present disclosure.
Figure 10A:
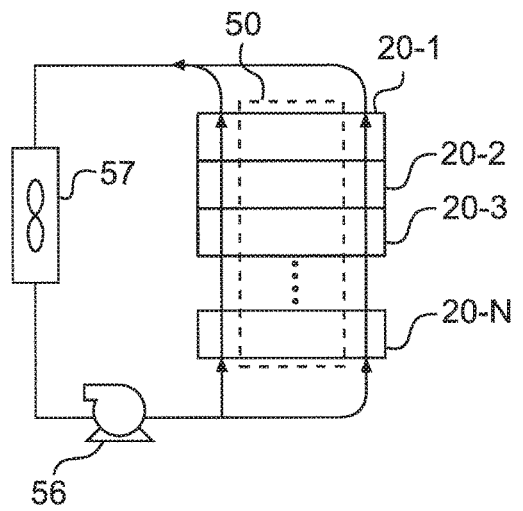
FIGS. 10A, 10B and 10C illustrate various possible coolant fluid flow configurations to convectively remove heat from the bipolar plate, in accordance with exemplary embodiments of the present disclosure.
Figure 10B:
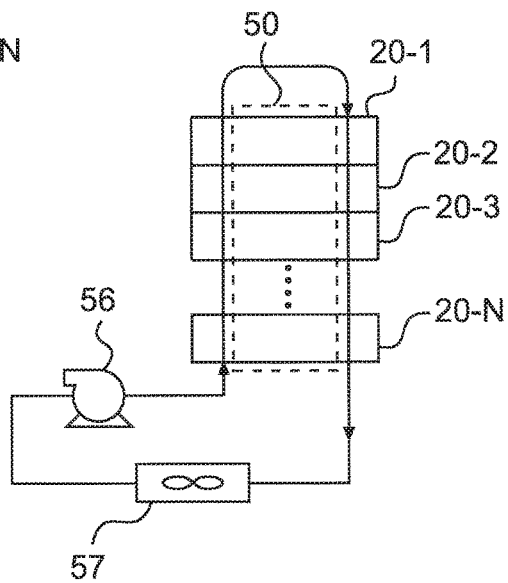
Figure 10C:
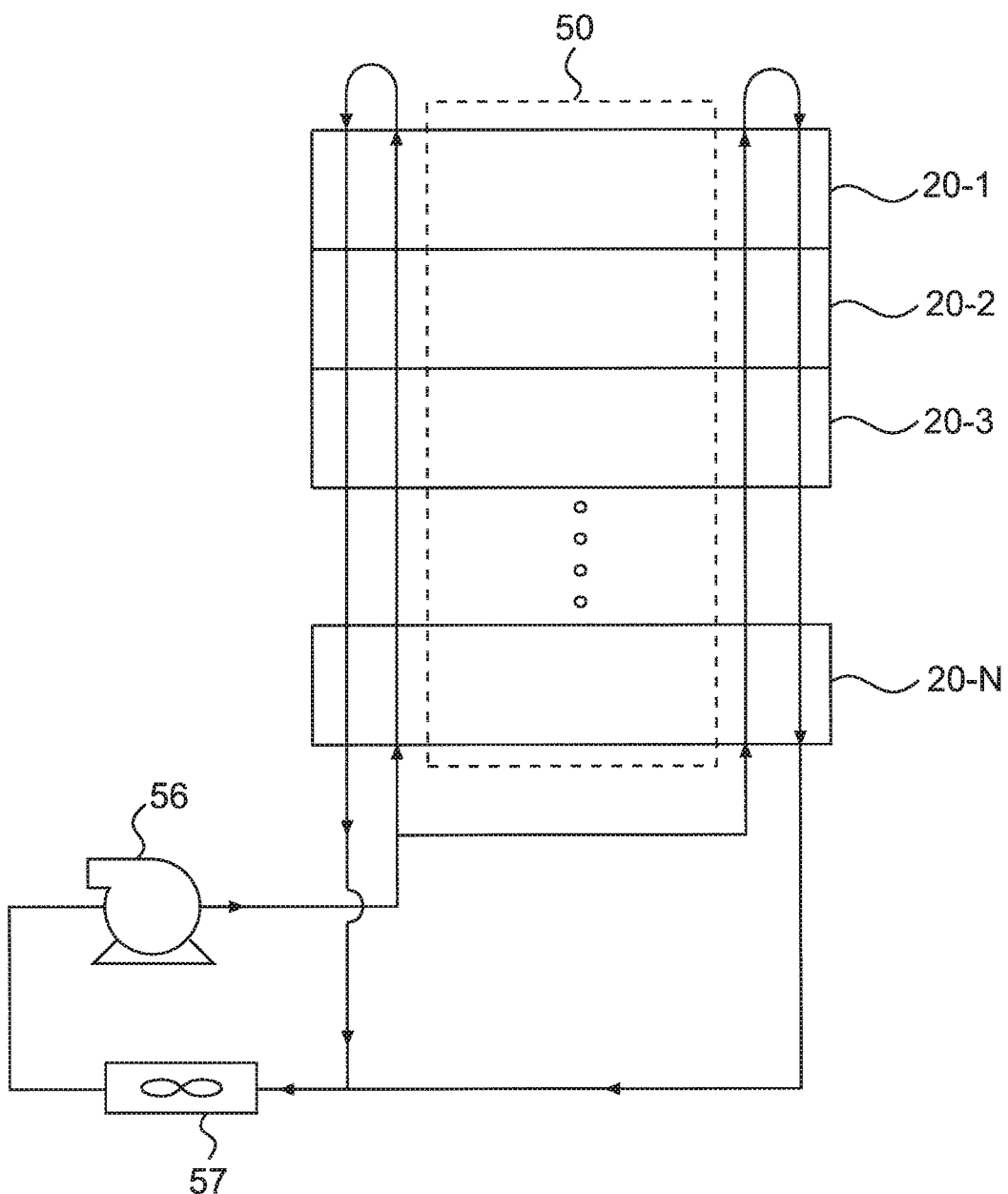

FIG. 9 illustrates a schematic front view of a conduction cooled electrochemical cell stack comprising N electrochemical cells 20. Area 50 in the cell stack represents the active, heat generating area of the stack and areas 55 represent the coolant fluid surfaces at two opposing sides of the cell stack. Heat generated in the active area 50 is conducted to areas 55 via the bipolar plates of the electrochemical cells 20. FIGS. 10A, 10B and 10C illustrate various possible coolant fluid flow configurations to convectively remove heat from areas 55. The coolant fluid is pumped through the cell stack using a closed-loop cooling system comprising a fluid pump 56 and a heat exchanger 57. Pump 56 drives coolant fluid through the coolant channels provided at the cooling areas 55 or contiguous to the cooling areas 55. The coolant fluid removes heat from the bipolar plates and flows to the heat exchanger where the heat from the coolant fluid is transferred to the ambient atmosphere. The coolant fluid is then pumped back to cooling areas 55 to remove the heat generated during the operation of the cells. Coolant fluid is pumped through the cooling areas 55 either in parallel, as shown in FIG. 10A, or in series, as depicted in FIG. 10B. In an additional embodiment depicted in FIG. 10C, the coolant fluid is looped through the two cooling areas 55 separately and in parallel. Such an arrangement minimizes the temperature gradient from cell-to-cell and across each cell. Further, in such embodiments, the coolant areas 55 comprise a second plurality of aligned holes/perforations through which a second set of coolant fluid channels are routed. The second plurality of holes/perforations being placed closer to the boundary of the active area 50 and the holes/perforations 43 are positioned closer to edge of the bipolar plate. Coolant fluid is flown in series first through the second plurality of holes/perforations and then through the holes/perforations 43.

The cooling arrangement described above in relation to FIGS. 9 and 10A-10C facilitates isolation of the coolant fluid from the active area of the cell and minimizes the risk of the coolant fluid contaminating the electrochemical materials in the cell. Such an arrangement also obviates the need for using separate cooling channels/plates between adjacent cells in the stack, which reduces the ohmic resistive losses within the stack, and thereby improves the efficiency of the stack. Additionally, the elimination of separate cooling channels within the stack simplifies the cell architecture, reduces manufacturing costs, and allows a consistent cooling architecture to be applied to both rectangular and circular cells. Further, it allows the active area of the cells to be scaled without the need to redesign or reconfigure the cooling components of the cell stack.

Figure 11:
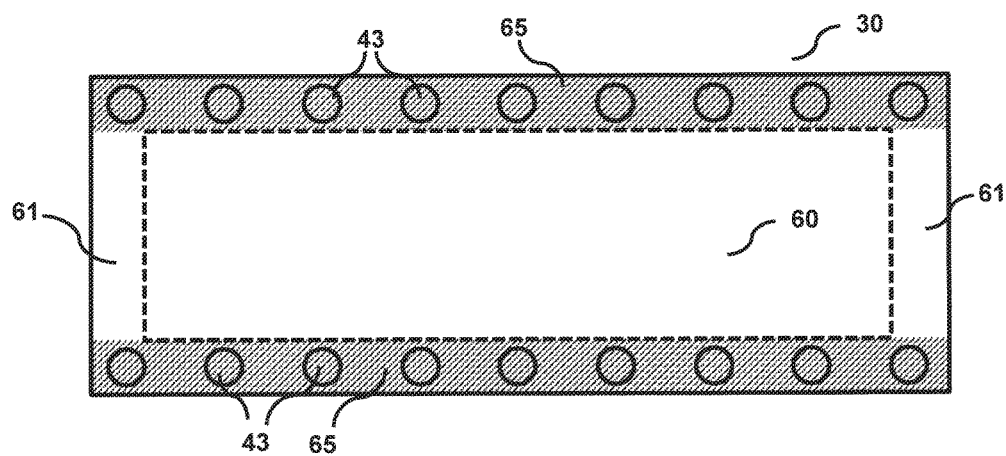
FIG. 11 illustrates a bipolar plate design wherein the long edges include cooling channels evenly distributed along the length, in accordance with exemplary embodiments of the present disclosure.

In various embodiments, structures and features within the cooling fluid surfaces can be configured to maximize the performance and robustness of an electrochemical cell by reducing the maximum temperature differential across the active area 60 of the cell. FIG. 11 illustrates a bipolar plate 30 having uniformly sized cooling channels 43 evenly distributed along the length of each long edge, according to various embodiments. Cooling channels 43 can be located outside of the active area 60 and within cooling fluid surfaces 65. As described above in relation to various embodiments, heat generated in the active area can transfer to cooling fluid surfaces 65 and be removed by coolant fluid traveling through the cooling channels 43.

Figure 12:
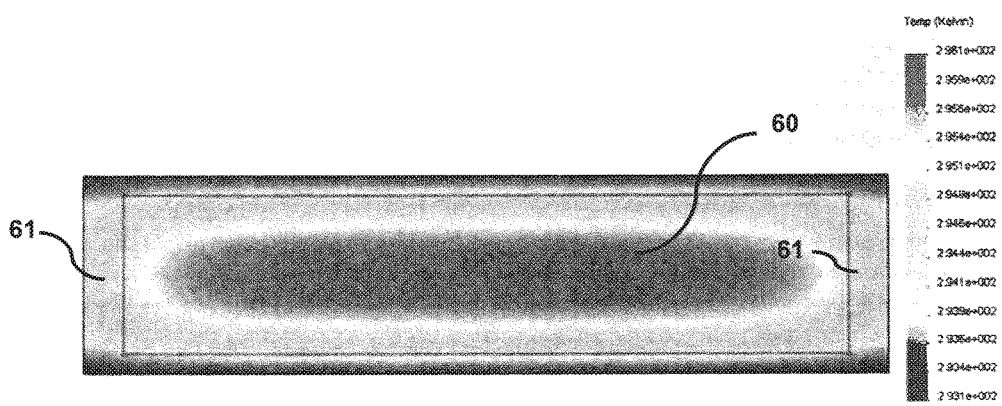
FIG. 12 illustrates a temperature profile for a standard rectangular bipolar plate wherein the temperature at the uncooled end-zone is generally lower than the temperature of the central active area.

One consequence of the configuration illustrated in FIG. 11, is that the temperature of active area 60 near the uncooled end-zones 61 (i.e., short edges) is generally lower than the temperature of the central active area due to the additional thermal conduction pathway and radiant heat loss at end-zones 61. For example, FIG. 12 illustrates a temperature profile for a rectangular bipolar plate wherein the temperature at the uncooled end-zones 61 is generally lower than the temperature of the central active area 60. This condition increases the maximum temperature differential across active area 60, which can adversely affect the performance and robustness of the electrochemical cell.

To resolve this potential issue, bipolar plate 30 can be configured to reduce the thermal conduction and radiant heat loss at or near end-zones 61, according to various embodiments. There are several design configurations that can be used to reduce the thermal conduction and radiant heat loss at or near end-zones 61.

Figure 13A:
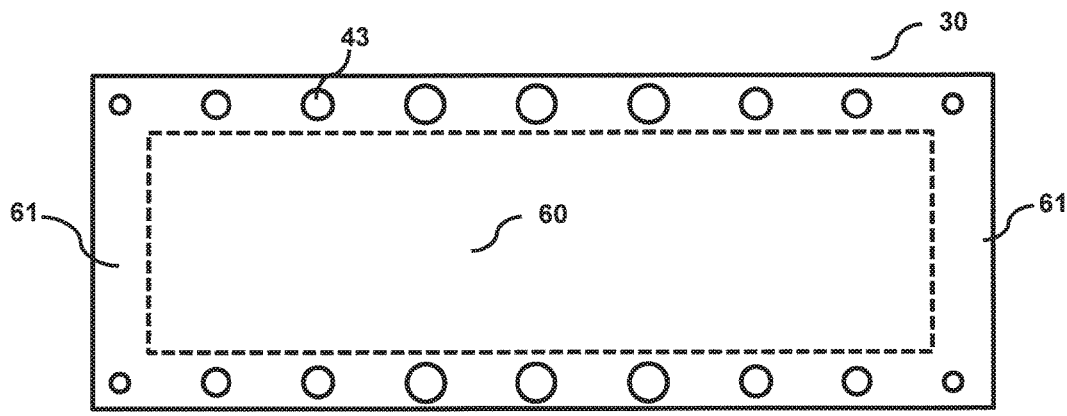
FIGS. 13A and 13B, illustrate two bipolar plate cooling channel configurations, in accordance with exemplary embodiments of the present disclosure.
Figure 13B:
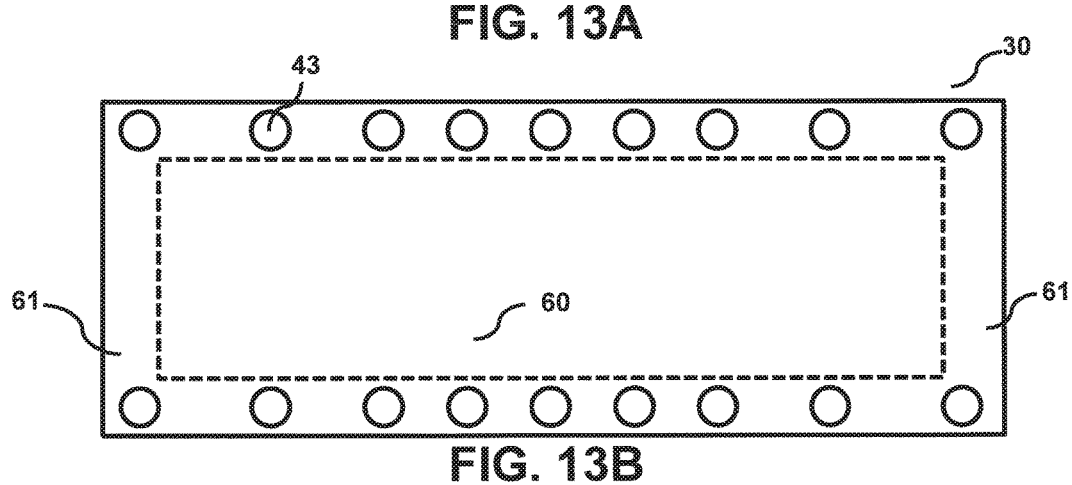

In the case of bipolar plates that use cooling channels, the channel size (i.e., cross-sectional area) can be varied or the spacing of the channels can be varied. For example, FIG. 13A illustrates bipolar plate 30 wherein the diameter of cooling channels 43 decreases approaching end-zones 61. The decreased cooling channel 43 diameter near end-zones 61 can reduce the capacity of cooling channels 43 to dissipate heat and therefore less heat will be transferred near end-zones 61. According to another embodiment, as illustrated in FIG. 13B, the cooling channels 43 spacing can increase approaching end-zones 61. Similar, to the decrease in diameter of cooling channels 43, the increase in spacing can decrease the capacity of cooling channels 43 to dissipate heat near end-zones 61. In other embodiments, a restriction (e.g., orifice, diffusion media, etc.) on coolant flow through cooling channels 43 near end-zones 61 can be used to decrease the capacity of the cooling channels to dissipate heat near end-zones 61.

Figure 13C:
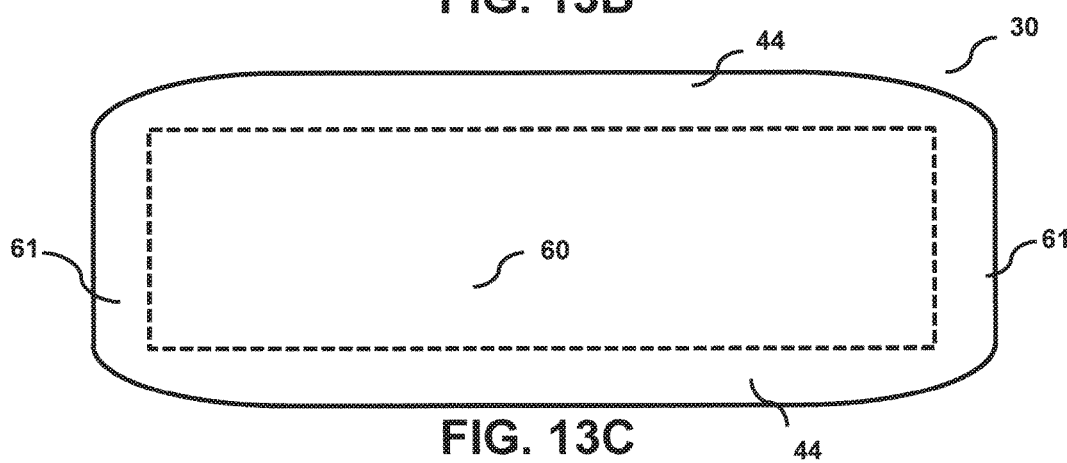
FIG. 13C illustrates a bipolar plate cooling fins configuration wherein the area is variable along the length of the long edges, in accordance with exemplary embodiments of the present disclosure.

According to another embodiment, as illustrated in FIG. 13C, bipolar plate 30 can include cooling fins 44, wherein the area of each cooling fin 44 can decrease approaching end-zones 61. The decrease in cooling fin 44 area can reduce the capacity to dissipate heat near end-zones 61. In other embodiments, a restriction (e.g., baffles, diffusion media, etc.) along or between cooling fins 44 near end-zones 61 can be used to reduce the capacity to dissipate heat near end-zones 61.

Figure 14A:
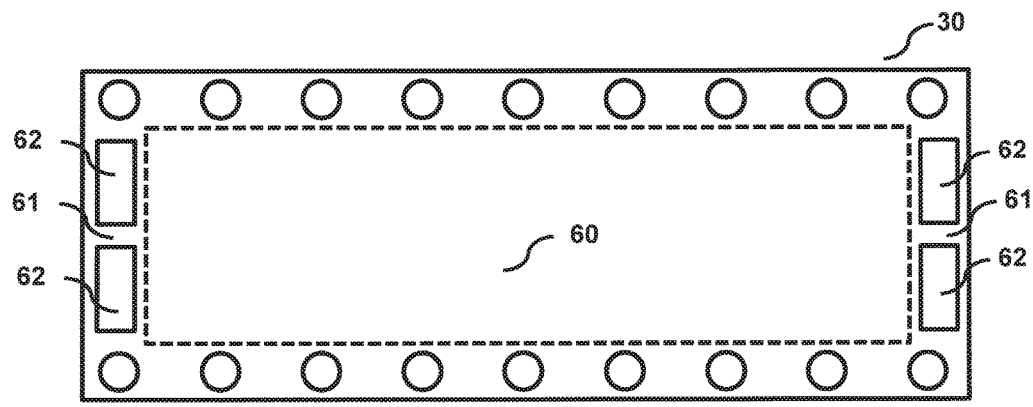
FIGS. 14A, 14B and 14C, illustrate various bipolar plate designs wherein the end-zones include features configured to reduce the rate of heat transfer through the end-zones, in accordance with exemplary embodiments.
Figure 14B:
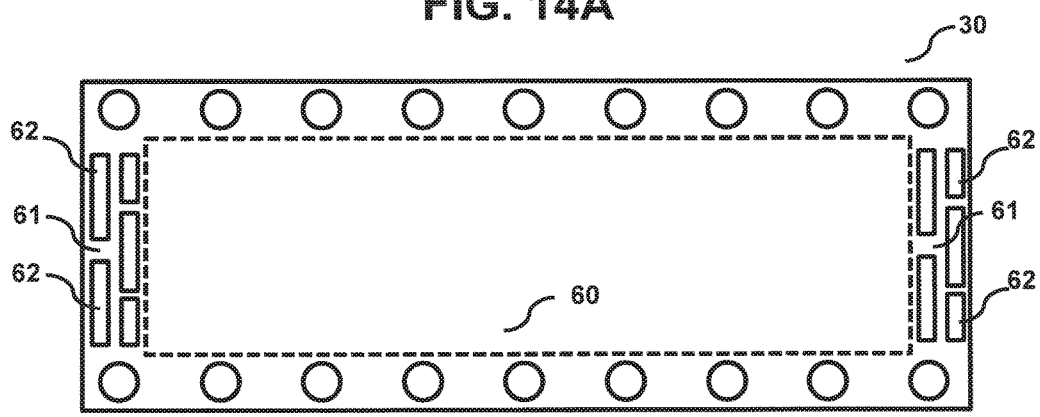

According to other embodiments, instead of modifying the coolant channels or fin area as illustrated in FIGS. 13A, 13B, and 13C, bipolar plate 30 can be configured to restrict heat flow in end-zones 61 to reduce the thermal conduction and radiant heat loss. For example, as illustrated in FIG. 14A, open voids can act as thermal insulation voids 62 within end-zones 61. Thermal insulation voids 62 can restrict heat flow from active area 60 through end-zones 61 and therefore increase the temperature of active area 60 near end-zones 61 and as a result decrease the maximum temperature differential across active area 60. Similarly, as illustrated in FIG. 14B, staggered thermal insulation voids 62 within end-zones 61 can increase the length of the thermal pathway and restrict heat flow from active area 60. It is contemplated that the shape (e.g., circle, square, rectangle, etc.), size, layout (i.e., pattern, rows, etc.), and number of thermal insulation voids 62 can be adjusted to optimize the rate of heat flow through end-zones 61. FIG. 13C illustrates, yet another embodiment of bipolar plate 30, wherein instead of thermal insulation voids, bipolar plate 30 includes insulation zones 63 within end-zones 61. Insulation zones 63 can be comprised of thermal insulation material configured to restrict heat flow from active area 60 through end-zones 61. It is contemplated that the shape (e.g., circle, square, rectangle, etc.), size, layout (i.e., pattern, rows, etc.), material(s), and number of insulation zones 63 can be adjusted to optimize the rate of heat flow through end-zones 61.

Figure 14C:
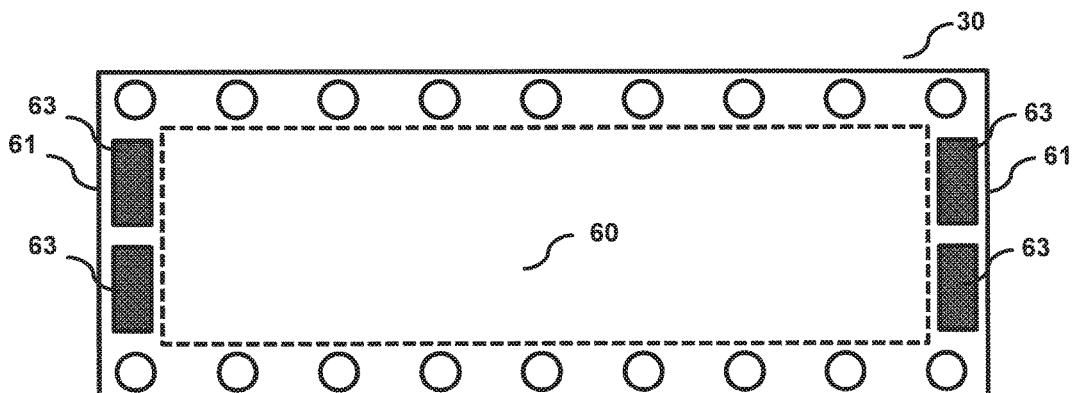
Figure 15A:
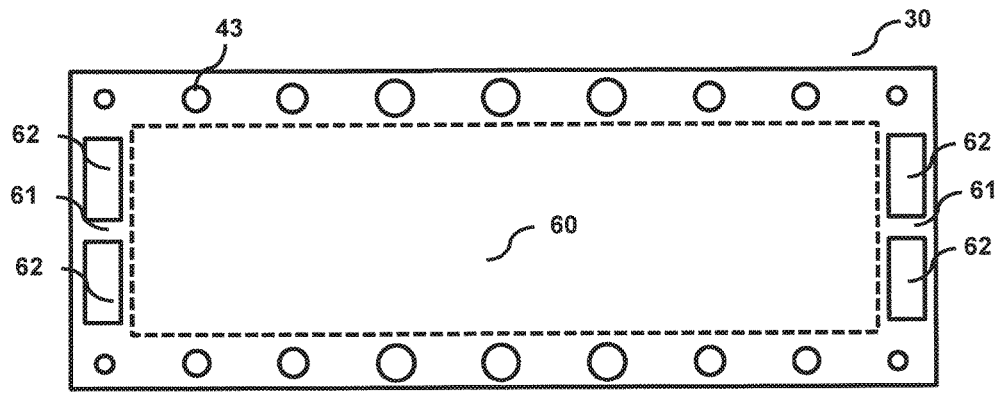
FIGS. 15A, 15B and 15C, illustrate various bipolar plate designs combining aspects of designs illustrated in FIGS. 13A, 13B, and 13C along with aspects of designs illustrated in FIGS. 14A, 14B, and 14C.
Figure 15B:
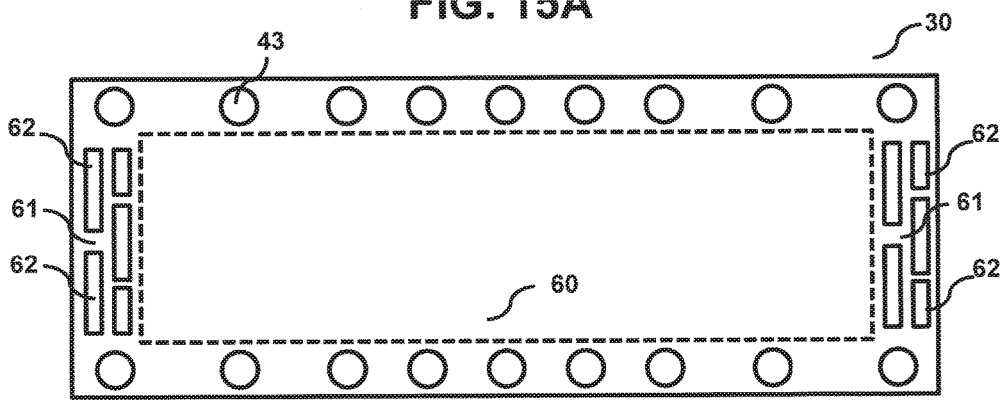
Figure 15C:
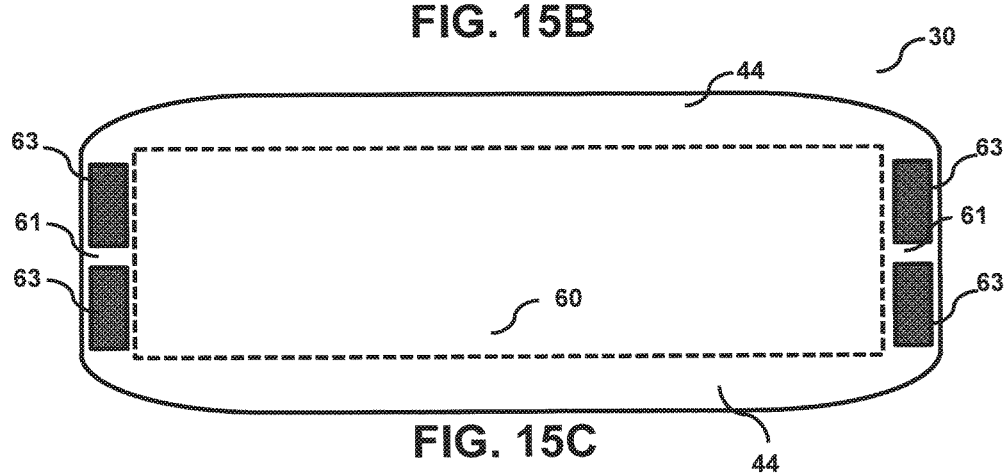

According to various other embodiments, bipolar plate 30 can be designed to reduce the thermal conduction and radiant heat loss at or near end-zones 61 by combining FIG. 13A, 13B, or 13C design with FIG. 14A, 14B, or 14C design. For example, FIGS. 15A, 15B, and 15C illustrate bipolar plate 30 designs comprising both structures/features within end-zones 61 configured to restrict heat flow as well as adjustments to either cooling channels 43 configuration or cooling fin 44 configuration to reduce the heat flow from active area 60 near end-zones 62. Specifically, FIG. 15A illustrates an embodiment, wherein both the diameter of the cooling channels 43 decreases near end-zones 61 and end-zones 61 include insulation voids 62. FIG. 15B illustrates an embodiment, wherein both the cooling channels 43 spacing increases near end-zones 61 and end-zones 61 include staggered insulation voids 62. FIG. 15C illustrates an embodiment, wherein both the cooling fin 44 area decreases near end-zones 61 and end-zones 61 include insulation zones 63. FIGS. 15A, 15B, and 15C illustrate just three of the possible combined embodiments; however, it is contemplated that any combination of FIG. 13A, 13B, or 13C bipolar plate design may be combined with any of FIG. 14A, 14B, or 14C bipolar plate design. The combination(s) can be optimized to maximize the performance and robustness of an electrochemical cell by reducing the maximum temperature differential across active area 60 of the cell.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrochemical cell comprising:
an active area comprising a first electrode, a second electrode, an electrolyte membrane disposed between the first and the second electrodes, and a first flow structure adjacent the first electrode;
a bipolar plate adjacent the first flow structure, the bipolar plate comprising a plurality of cooling channels;
wherein the plurality of cooling channels run through the bipolar plate perpendicular to a surface of the bipolar plate, and the plurality of cooling channels include a first set and a second set of cooling channels located on opposite sides of the active area that are spaced along a perimeter of the active area;
wherein a first portion of the first set of cooling channels are fluidly connected in parallel to define a first flow path in a first direction and a second portion of the first set of cooling channels are fluidly connected in parallel to define a second flow path in a second direction; and
wherein the first flow path and second flow path are fluidly connected in series and the first direction is opposite the second direction.

2. The electrochemical cell of claim 1, wherein the spacing between the cooling channels increases approaching end zones of the active area.

3. The electrochemical cell of claim 1, wherein at least one set of the cooling channels has cooling channels with about equal diameters.

4. The electrochemical cell of claim 1, wherein at least one set of the cooling channels has cooling channels with variable diameters.

5. The electrochemical cell of claim 4, wherein at least one set of the cooling channels is aligned equidistant along the perimeter of the active area.

6. The electrochemical cell of claim 1, further comprising a second bipolar plate.

7. The electrochemical cell of claim 6, further comprising a second flow structure between the second electrode and the second bipolar plate.

8. The electrochemical cell of claim 7, wherein the second bipolar plate has a plurality of cooling channels that align with the plurality of cooling channels of the first bipolar plate.

9. The electrochemical cell of claim 7, wherein at least one of the first and the second flow structures comprises a porous substrate.

10. The electrochemical cell of claim 7, wherein at least one of the first and the second flow structures comprises a compacted porous metallic substrate.

11. An electrochemical cell stack comprising:
two or more electrochemical cells, at least one electrochemical cell comprising:
an active area comprising a first electrode, a second electrode, an electrolyte membrane disposed between the first and the second electrodes, and a first flow structure adjacent the first electrode;
a bipolar plate adjacent the first flow structure, the bipolar plate comprising a plurality of cooling channels;
wherein the plurality of cooling channels run through the bipolar plate perpendicular to a surface of the bipolar plate, and the plurality of cooling channels includes a first set and a second set of cooling channels located on opposite sides of the active area that are spaced along a perimeter of the active area;
wherein a first portion of the first set of cooling channels are fluidly connected in parallel to define a first flow path in a first direction and a second portion of the first set of cooling channels are fluidly connected in parallel to define a second flow path in a second direction;
wherein a first portion of the second set of cooling channels are fluidly connected in parallel to define a third flow path in the first direction and a second portion of the second set of cooling channels are fluidly connected in parallel to define a fourth flow path in the second direction; and
wherein the first flow path and second flow path are fluidly connected in series, the third flow path and fourth flow path are fluidly connected in series, and the first direction is opposite the second direction.

12. The electrochemical stack of claim 11, wherein the spacing between the cooling channels increases approaching end zones of the active area.

13. The electrochemical stack of claim 11, wherein at least one set of the cooling channels has cooling channels with about equal diameters.

14. The electrochemical stack of claim 11, wherein at least one set of the cooling channels is aligned equidistant along the perimeter of the active area.

15. The electrochemical stack of claim 14, wherein diameters of the cooling channels decrease approaching end zones of the active area.

16. The electrochemical stack of claim 11, wherein the at least one electrochemical cell further comprises a second bipolar plate and a second flow structure between the second electrode and the second bipolar plate, wherein the second bipolar plate has a plurality of cooling channels that align with the plurality of cooling channels of the first bipolar plate.

17. The electrochemical cell of claim 1, wherein a first portion of the second set of cooling channels are fluidly connected in parallel to define a third flow path in the first direction and a second portion of the second set of cooling channels are fluidly connected in parallel to define a fourth flow path in the second direction; and
    wherein the third flow path and fourth flow path are fluidly connected in series and the first direction is opposite the second direction.

18. The electrochemical cell of claim 1, wherein one or more of the plurality of cooling channels include a plurality of fins.

19. The electrochemical cell stack of claim 11, wherein a first portion of the second set of cooling channels are fluidly connected in parallel to define a third flow path in the first direction and a second portion of the second set of cooling channels are fluidly connected in parallel to define a fourth flow path in the second direction; and
    wherein the third flow path and fourth flow path are fluidly connected in series and the first direction is opposite the second direction.

20. The electrochemical cell stack of claim 11, wherein one or more of the plurality of cooling channels include a plurality of fins.

\* \* \* \* \*